Oct. 14, 1958     W. J. HILDEBRANDT ET AL     2,856,125
BI-DIRECTIONAL TABULATING MECHANISM
Filed Feb. 28, 1956     4 Sheets-Sheet 1
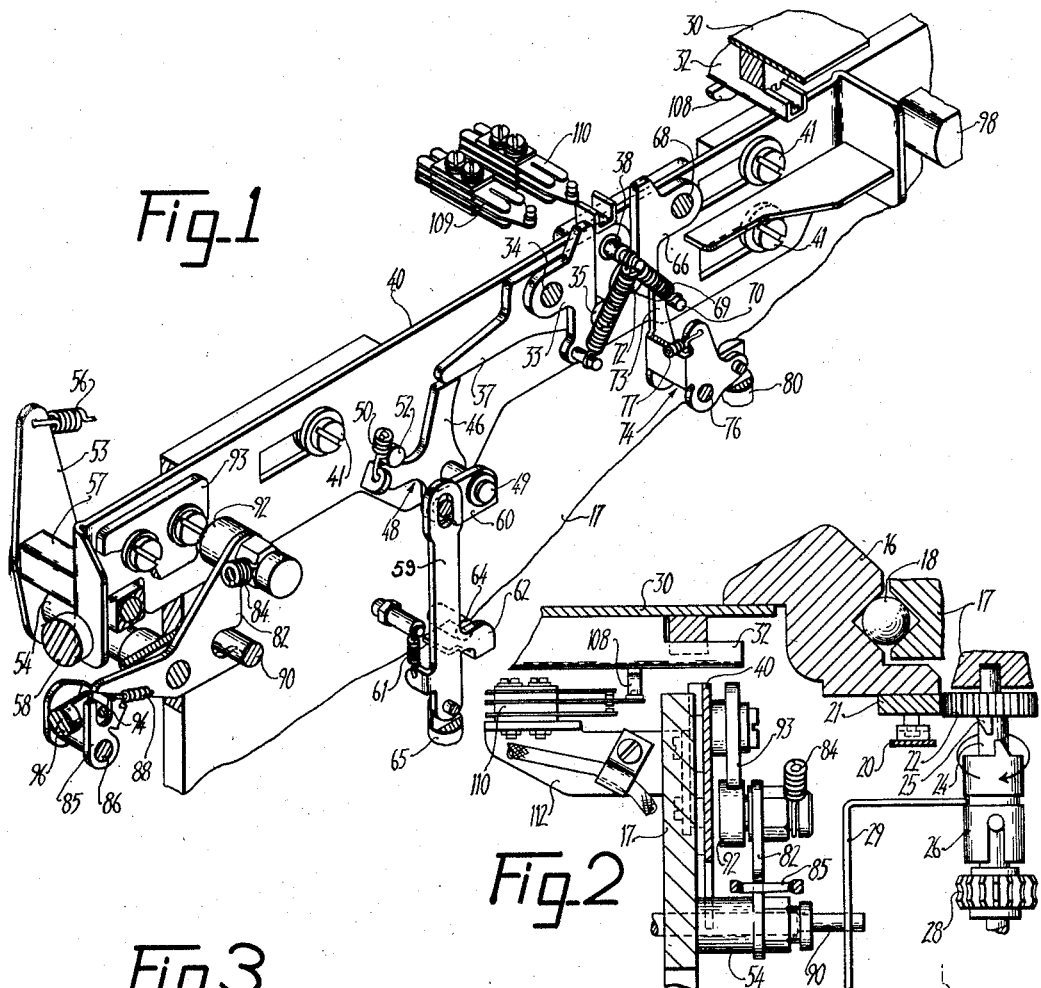
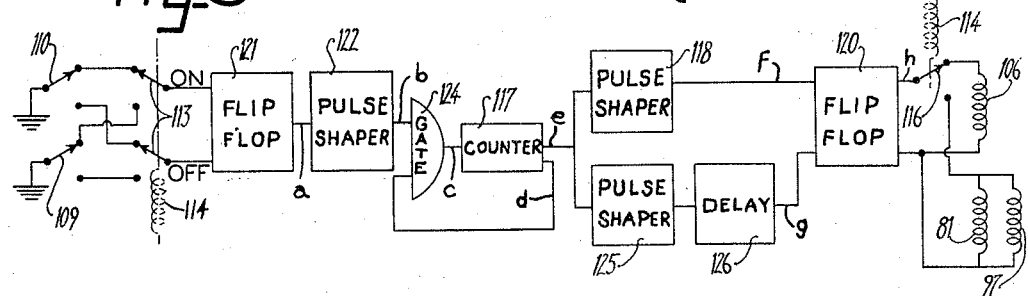
INVENTORS.
WILLIAM J. HILDEBRANDT
RICHARD W. YERKS
VINCENT A. MALATESTA
BY Jesse A. Holton
ATTORNEY

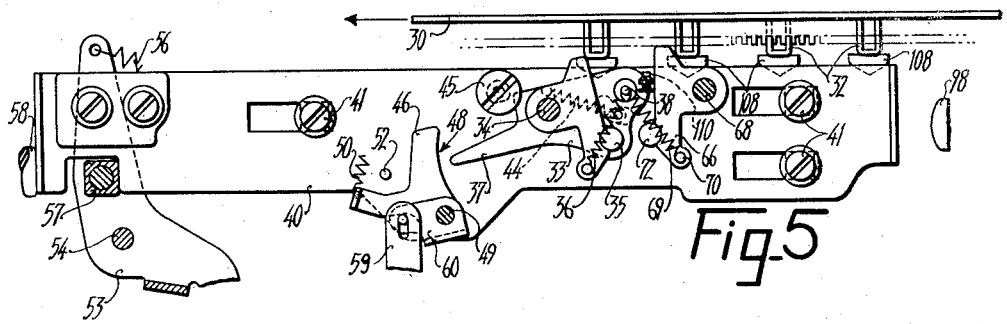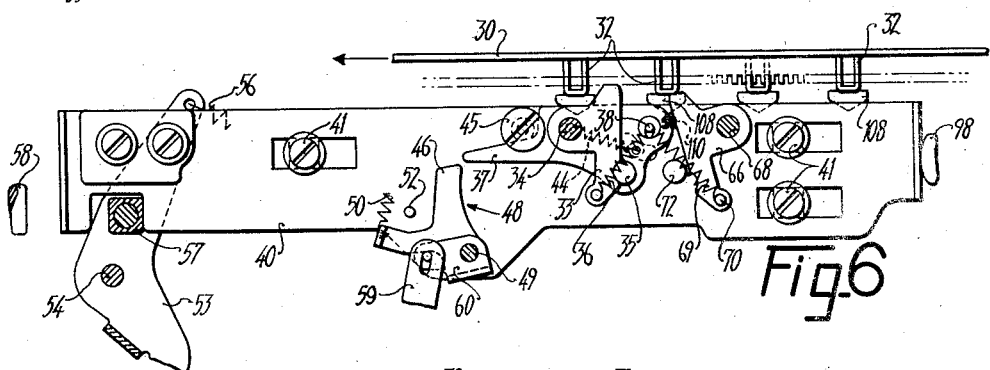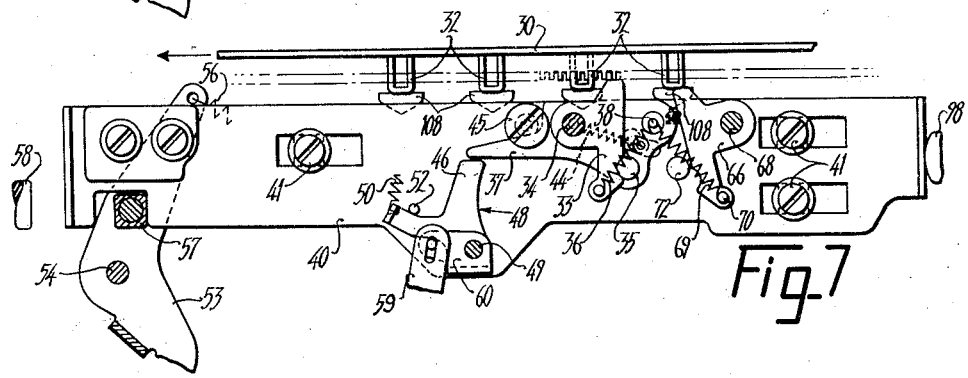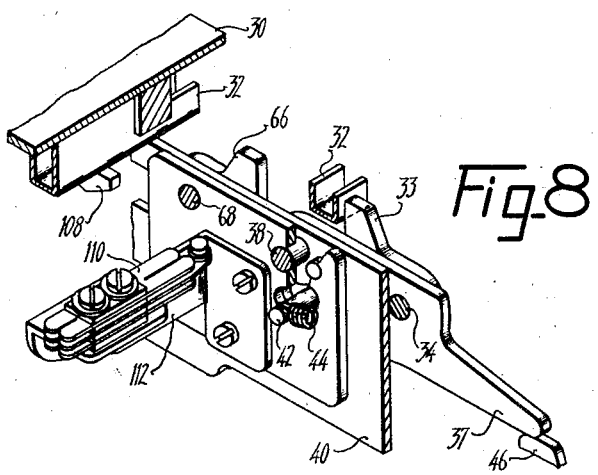

INVENTORS.
WILLIAM J. HILDEBRANDT
RICHARD W. YERKS
VINCENT A. MALATESTA

BY Jesse A. Holton

ATTORNEY

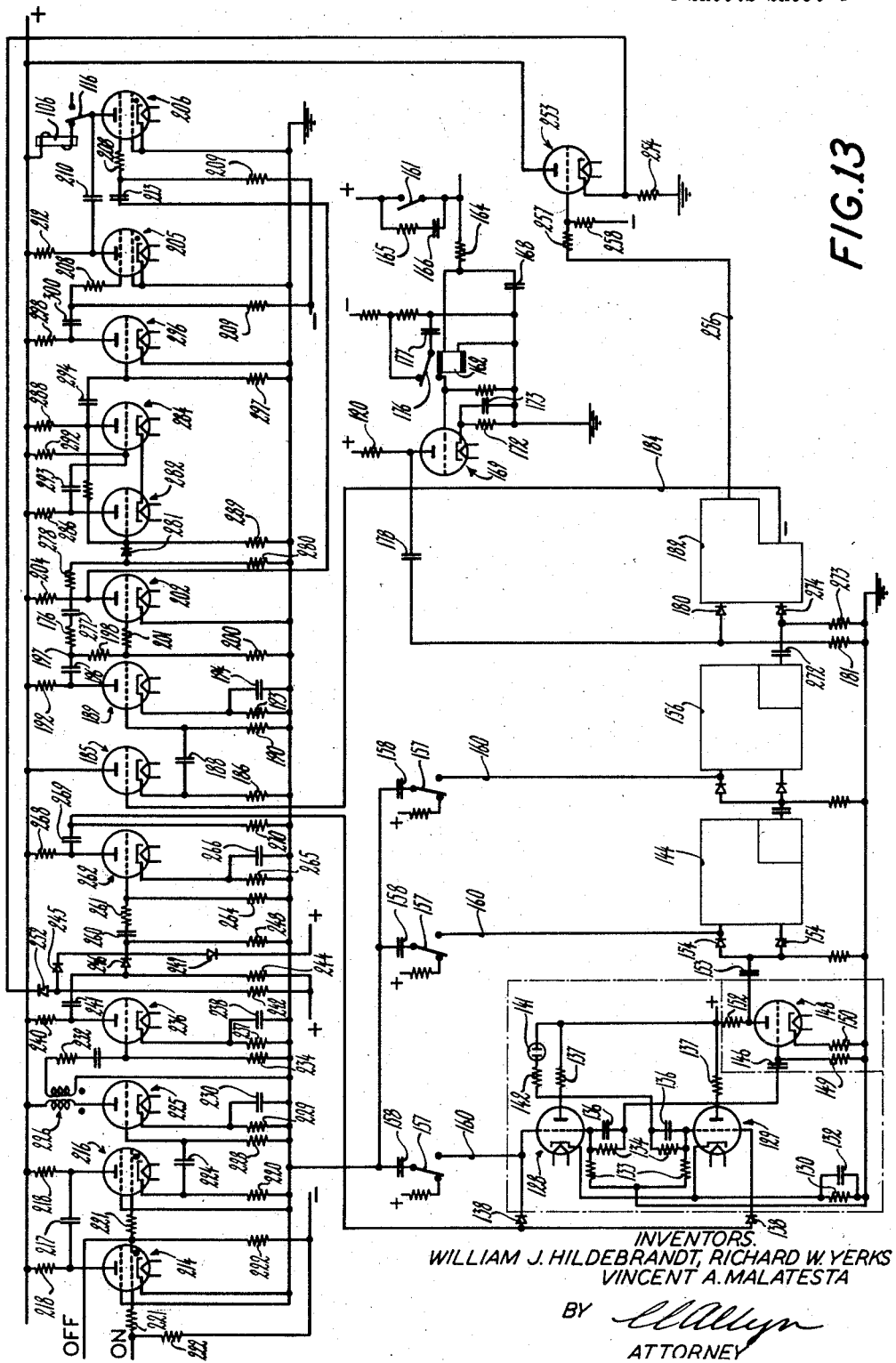

United States Patent Office 2,856,125
Patented Oct. 14, 1958

2,856,125

BI-DIRECTIONAL TABULATING MECHANISM

William J. Hildebrandt, Farmington, Richard W. Yerks, Manchester, and Vincent A. Malatesta, East Hartford, Conn., assignors to Underwood Corporation, New York, N. Y., a corporation of Delaware Application February 28, 1956, Serial No. 568,202

14 Claims. (Cl. 235—60.46)

This application relates to a carriage positioning mechanism for an accounting machine and more particularly to devices to control the movement of a business machine carriage in either direction for a predetermined number of columnar positions.

There has long been a need for a carriage control mechanism which is operative automatically to shift a carriage through a number of columnar spaces in either direction of carriage movement to position the carriage at a selected columnar position. Mechanisms have been devised to enable express tabulation through a number of columnar positions to the next column of a special character or, by extension of that principle, to the next column of a selected one of several groups. In the normal return direction, it has been possible to return the carriage to a selected one of two or three end positions. It has not, however, been practical to move a paper carriage for a business machine directly from any position to any other position.

It is therefore an object of the present invention to develop a simple carriage control mechanism for a business machine carriage to control the extent of carriage movement in either direction.

Another object is to provide controls over the carriage moving mechanisms of a business machine to permit a movement of the carriage directly to any selected column.

A further object is to develop an automatically operable control mechanism to tabulate or return a machine carriage through a number of columnar positions which may be of varying widths.

Still another object is the provision of a presettable device to select the direction of carriage movement and the number of columnar positions through which the carriage is to move in the selected direction.

An additional object is the development of an arresting mechanism for a carriage to positively arrest a carriage at a selected position irrespective of the direction of movement of said carriage.

As a part of the above objects, an object is to provide a pair of carriage arresting stops, each stop being effective to stop the movement of the carriage in one direction and operating means to selectively render either stop ineffective.

A still further object is the provision of a carriage tabulating and return control mechanism selectively settable to determine the direction of movement of the carriage and the number of columnar positions through which the carriage should move and which control mechanism is operated by the carriage to count the number of columns through which the carriage passes and acts to arrest the carriage after the preselected number of columns have been passed through.

Other objects and aims incident to the above will be specifically pointed out or obvious from the following description of the preferred embodiment of our invention shown in the appended drawings.

In the drawings:

Figure 1 is a front left perspective view of the carriage arresting mechanism of our invention, Figure 2 is a left side view of the mechanism of Figure 1 and includes a portion of the carriage and the return drive therefor, Figure 3 is a block diagram of the electronic controls for the carriage arresting mechanism, Figure 4 is a timing chart showing the time relation between the elements of Figures 3 and 13, Figure 5 is a front view of the mechanism of Figure 1 with the carriage released for tabulation, Figure 6 is similar to Figure 5 but shows the parts at a later stage of tabulation, Figure 7 is also similar to Figure 5 but shows the parts reset to arrest the carriage at the next columnar position, Figure 8 is a rear left perspective showing the details of mounting the carriage controlled tabulating switch on the carriage arresting mechanism, Figure 9 is a front view of the carriage arresting mechanism with the parts in their positions at the start of a carriage return operation, Figure 10 is similar to Figure 9 with the carriage returning to the selected columnar position, Figure 11 is similar to Figure 9 but with the carriage arrested at the end of the carriage return, Figure 12 shows the carriage arresting mechanism of Figures 5 to 11 in the normal rest position, and Figure 13 is a detailed circuit diagram of one embodiment of the electronic controls of Figure 3.

GENERAL DESCRIPTION

Basically the business machine to which the present carriage control mechanism is applied is a commercial accounting machine sold under the trademark "Sundstrand" and having a carriage substantially as shown in U. S. Patent 2,536,524, issued January 2, 1951, to Walter A. Anderson. In the machine of the above patent, it is possible to tabulate the carriage from any column to the next column to the right or to express tabulate from a column to the next right hand column in which a special stop is positioned. Similarly for carriage return the carriage may be restored to a left end position or to an intermediate return position by use of a so-called shuttle key. Such controls which have available at best only two stopping positions in each direction of travel have been found insufficient when the positioning of the carriage is to be automatically controlled to enable printing in any column of a complex work sheet and in a substantially random pattern.

Use of such work sheets with resultant requirements of tabulation or return from any columnar position to any other columnar position is particularly valuable when the business machine is remotely controlled to serve as the printing mechanism for an electronic computer working on payroll, accounting, inventory or the like data having multiple classifications of items. Since there is no regular pattern of columnar selection, the position to which the carriage is to tabulate is controlled by a plurality of switches described herein as manually controlled although it will be obvious that such switches may be operated by a connected computing device in accordance with a program of operations in such computer. The switches are preset to enter into a counter the number of columns through which the carriage is to tabulate or return, and the direction in which the carriage is to move and, upon operation, of an initiating device, the carriage will be released for such movement. The carriage arresting mechanism of the above patent is revised to be operative to positively arrest the carriage in either direction of movement for the carriage of the patent moves freely for an appreciable distance after release of the carriage return mechanism and such free movement may be sufficient to move the carriage into the next columnar position, particularly if the columns are closely spaced. In the present construction, two stop dogs, each bypassable in one direction by stops on the carriage are selectively disabled to free the carriage for movement and are enabled at the proper time to catch a stop of the carriage between them. The proper time for enabling of the disabled stop is controlled from a counter which is preset for the number of columns to be skipped and also counts the number of columns passed through by the carriage. When the correct carriage stop enters the arresting position, the disabled stop dog is again set to a carriage arresting position.

The stop dogs are mounted on a slidable frame and when the carriage engages one of these dogs, the frame moves against a resistance, a spring, dashpot or the like, to smoothly bring the carriage to a stop.

DETAILED DESCRIPTION

Figure 9:
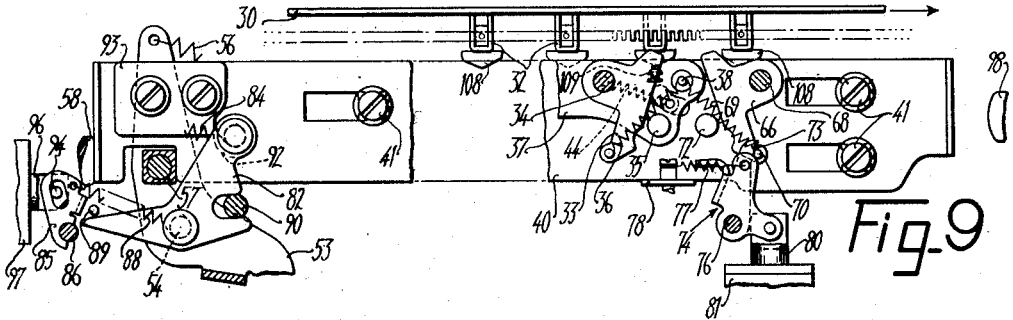

Referring to Figures 1 and 2, the machine described in the above patent includes a traveling carriage 16, only a fragment of said carriage being shown herein, slidably mounted on a frame 17 by ball bearings 18. The carriage 16 is drawn to the left in Figure 1 by the usual spring drum connected to a carriage draw band 20 secured to a rack bar 21, Figure 2, on carriage 16. A gear 22 free on a shaft 24 rotatable in frame 17, has downwardly projecting lugs 25 engageable by lugs on a sleeve 26 which is slidable on shaft 24 and rotatable therewith. A worm gear 28 secured to the lower end of shaft 24 is connected to a motor drive to continuously rotate shaft 24 in the direction shown by the arrow in Figure 2, so long as the machine is in operation. A vertically movable slide 29 on the machine frame 17 has an arm engaged in a groove of sleeve 26 to shift the sleeve from a lower position as in Figure 2 to an upper position in engagement with lugs 25 of gear 22 which will cause carriage 16 to be driven to the right in Figure 1 as more fully set out in the above Patent 2,536,524.

Secured to the rear of carriage 16 is a control plate 30 having magazines 32 adjustably secured thereto to define columnar positions of carriage 16 by the engagement of the front ends of magazines 32 with a tabulator stop 33. Tab stop 33 is pivoted on a stud 34 and is urged counterclockwise, Figure 1, by a spring 36 to hold its lower end in contact with a stud 35. Studs 34 and 35 are secured in an arm 37 pivoted on a stud 38 in a plate 40 slidable on studs 41 secured in frame 17. A stud 42 on arm 37 projects rearwardly through a slot in slide 40, see Figure 8, and is urged by a spring 44 to hold the left end of arm 37 clockwise, Figures 5, 6, and 7, against a screw 45 in slide 40. The left end of arm 37 is normally retained in its upper position by an arm 46 of a bell crank 48 pivoted on a stud 49 in slide 40 and urged clockwise, Figure 1, by a spring 50 against a stop 52 in plate 40.

Plate 40 is pressed to the right in Figure 1 by an arm 53 pivoted on a post 54 in frame 17 and urged clockwise by a spring 56. A cushioned post 57 on arm 53 engages a shoulder on the left end of plate 40 to urge it to the right on studs 41. Plate 40 will, however, be normally held to the left in the Figure 1 position with its left end in engagement with a fixed bumper 58 by the engagement of the front end of one of the magazines 32 on control plate 30 with the tab stop 33, the leftward urge of the carriage 16 by its spring through drawband 20 being sufficient to overcome the urge of spring 56 on arm 53.

Leftward tabulation (Figures 1, 5, 6, and 7)

When carriage 16 is to be released for leftward movement under the urge transmitted through drawband 20, arm 46 of bell crank 58 is withdrawn from under arm 37 by a means to be later described but including a link 59 connected to a front arm 60 of bell crank 48 and urged upwardly by a spring 61 to hold an ear 62 of link 59 against a stud 64 in frame 17. The lower end of link 59 is connected to an armature 65 pulled downwardly by a solenoid 106, Figure 13, referred to in the later description of the electrical circuits, to rock bell crank 48 counterclockwise to the position shown in Figure 5. Now the leftward pull of carriage 16 transmitted through magazine 32 against tab stop 33 will rock arm 37 counterclockwise against the urge of its spring 44 into the Figure 5 position where magazine 32 will pass over the top of tabulator stop 33. As soon as magazine 32 depresses tab stop 33, arm 53 driven by spring 56 will shift slide plate 40 to the right and arm 37 will be rocked by its spring 44 to the Figure 6 position with stop 33 to the left of the next magazine 32. As the carriage 16 continues to the left, the successive magazines 32 will contact tab stop 33 and rock arm 37 as shown without returning slide 40 to the left.

When tabulation is to be terminated, link 59 is released by deenergization of the operating solenoid 106 as will be described to free bell crank 48 which will thereupon be moved clockwise to put its arm 46 under the left end of arm 37 as soon as arm 37 is in its upper position as shown in Figure 7. Now when the next magazine 32 strikes tab stop 33, rocking of arm 37 will no longer be permitted and instead plate 40 will be carried leftward by the carriage 16 until slide 40 abuts bumper 58. The return movement of arm 53 by slide 40 may be suitably damped, as by a dashpot, to reduce the speed of carriage 16 during the arresting motion of slide 40 to bring the carriage 16 to a smooth stop with the parts again in the Figure 1 position.

During the leftward tabulation as above described, a second tab stop 66 on plate 40 is actuated idly by passage of successive magazines 32 thereby. This tab stop 66 is pivoted on a stud 68 fixed in plate 40 and is urged clockwise by a spring 69 connected between stud 38 and a stud 70 on the lower end of stop 66 to bring the lower end of the stop 66 against a stud 72 in plate 40. As will be clear from Figures 6 and 7, the leftward movement of the magazine 32 will rock tab stop 66 on its pivot 68 so that stop 66 is ineffective to arrest such leftward carriage movement.

Rightward tabulation (Figures 1, 2, and 9–12)

When carriage 16 is to be moved to the right, tab stop 66 which would prevent such movement must be rendered ineffective and sleeve 26, Figure 2, must be raised to enable the motor of the machine to drive gear 22 to move carriage 16 to the right. It will be noted, Figure 1, that stud 70 of stop 66 is, when slide 40 is in its leftward position, in engagement with an arm 73 of a yoke 74 pivoted on a stud 76 in frame 17 and urged counterclockwise by a spring 77 to hold an ear bent off of yoke 74 against a stop plate 78 on frame 17. The forward arm of yoke 74 is connected to the armature 80 of a solenoid 81, Figures 9 to 12, to be described later but which is actuated as shown in Figure 9 to rock yoke 74 clockwise and thereby move tab stop 66 to a position free of magazines 32.

Figure 10:
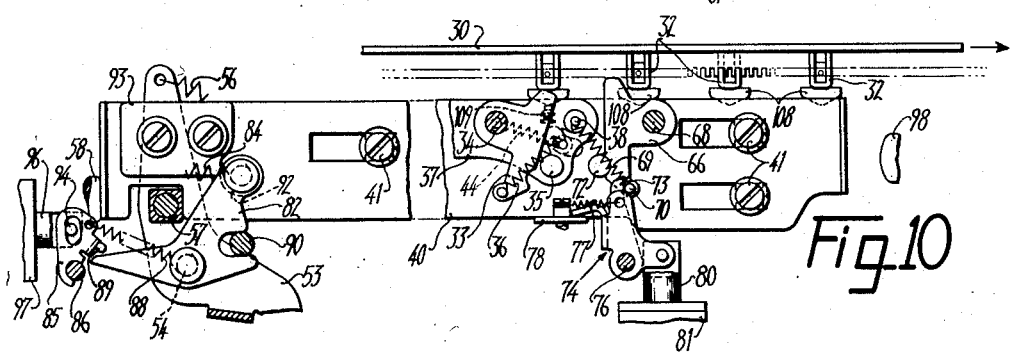
Figure 11:
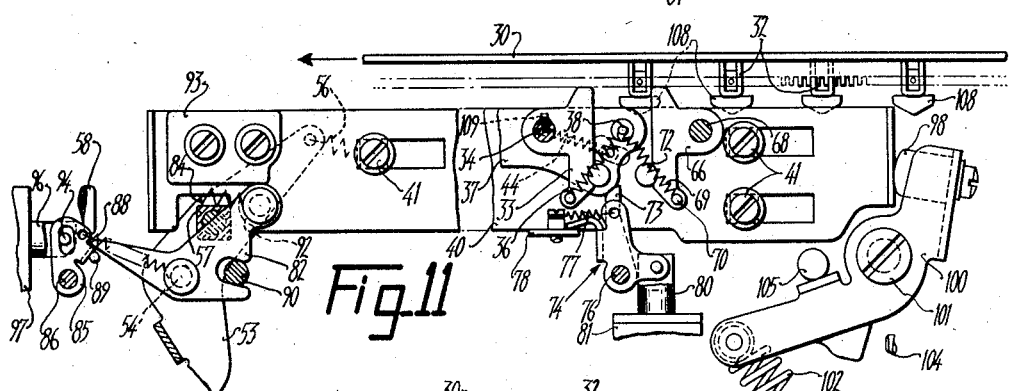
Figure 12:
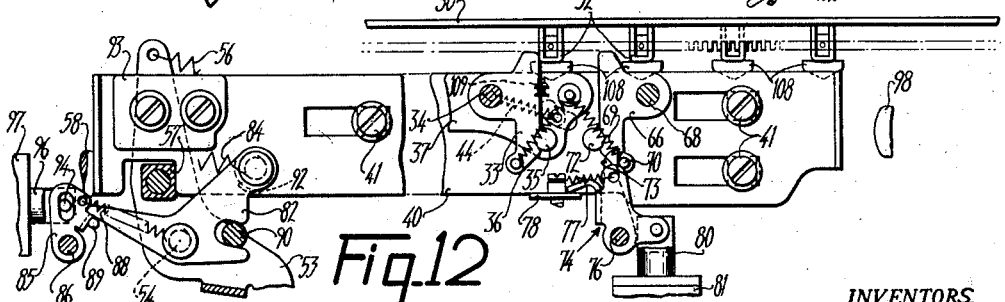

Sleeve 26 is lifted by slide 29 to drive carriage 16 to the right by a bell crank 82 pivoted on the forward part of post 54 and urged counterclockwise by a strong spring 84 between bell crank 82 and frame 17 to hold a left arm of the bell crank 82 in engagement with a yoke 85. Yoke 85 is pivoted on a fixed stud 86 and is urged under the arm of bell crank 82 by a spring 88 between the yoke 84 and post 54 to a position against a fixed stop 89 as shown in Figures 10, 11, and 12. A post 90 fixed to slide 29 passes through a slot in bell crank 82 to lift sleeve 26 upon each counterclockwise rocking of bell crank 82. The upper arm of bell crank 82 carries a roller 92 which is normally out of the path of movement of a plate 93 secured to the left end of plate 40.

The forward leg of yoke 85 is slotted to engage a pin 94 in the armature 96 of a solenoid 97, Figures 9 to 12, connected in parallel with solenoid 81 as will be shown later. Energization of solenoid 97 will release bell crank 82 to lift sleeve 26 and engage the drive for moving the carriage 16 to the right while at the same time roller 92 by its engagement with the right edge of plate 93 on slide 40 will hold slide plate 40 in the original leftward position. The carriage 16 will thereupon be driven to the right with the parts in the positions shown in Figure 9. It will be noted that tab stop 33 is ineffective to arrest such rightward movement of the carriage as each magazine 32 merely rotates the tab stop 33 idly on its pivot 34.

When the rightward movement of carriage 16 is to be arrested, solenoids 81 and 97 are deenergized to free tab stop 66 and latch yoke 85. Tab stop 66 follows arm 73 of yoke 74 as soon as the stop is free of any magazine 32 over it and moves into the arresting position as shown in Figure 10. As the next carriage magazine 32 engages the tab stop 66, it carries stop 66 and plate 40 to the right with the carriage 16 into engagement with a bumper 98 on a lever 100 pivoted on a fixed stud 101 for movement between stop pins 104 and 105 and urged counterclockwise by a spring 102, Figure 11. The yield of bumper 98 and its lever 100 will snub the rightward movement of plate 40 and carriage 16 to arrest the carriage without excessive shock. During the rightward movement of plate 40, the plate 93 thereon will engage roller 92 to cam bell crank 82 clockwise to a position wherein yoke 85 will engage beneath the left arm of the bell crank to hold it in its restored position. Restoration of bell crank 82 will also pull down on post 90 to lower the sleeve 26 and disconnect the rightward drive of the carriage 16 which then continues its rightward motion by inertia to bring the plate 40 against bumper 98. As soon as the carriage 16 is arrested, the pull of drawband 20 moves the carriage to the left to bring the magazine away from tab stop 66 and into engagement with tab stop 33 thereby shifting plate 40 again to the left into the normal position of Figure 12.

*Tabulating controls (Figures 1 to 4 and 8)*

The extent of tabulation, i. e. the number of columns through which the carriage 16 is to be tabulated as above set out is determined by a preset electronic control mechanism including a counter which may be set for the desired number of columns of tabulation and a settable switch for the direction of tabulation. Upon operation of a start switch, tabulation will be initiated in the proper direction and, as each column is passed through, the counter in the control will be operated to add one count. When the counter is filled to its capacity, the next count will return it to zero whereupon the counter acts to deenergize the tabulation magnets 81 and 97 or solenoid 106, Figure 3, for armature 65, Figure 1. For purposes of illustration, the counter setting, direction, and start switches may be considered as manually controlled although it will be obvious that more rapid and efficient operation will result with automatic controls over these switches, it being intended that such switches shall be included in an electronic computer and controlled thereby to enable printing of computed results in selected columns of a carriage carried work sheet.

The counter inputs are controlled by cams 108 one secured to each magazine 32. Two double throw switches have their movable contacts in the path of these cams 108 and will be actuated thereby to alternately connect their output circuits to the common terminal as the switch is actuated by the cams 108. The left hand one 109 of these switches, Figures 1 and 9 to 12, is secured the frame 17 and will be effective during rightward tabulation whereas the other, right-hand, switch 110 is fixed on a bracket 112, Figures 2 and 8, secured to slide plate 40 and projecting rearwardly through an opening in the frame 17. Switch 110 is effective in leftward tabulation and moves with plate 40 to insure that the switch 110 will be operated a fixed distance to the right of the tab stop 33 at all times, thus giving sufficient time to deenergize solenoid 106 and restore arm 46 of bell crank 48 under arm 37 before tab stop 33 is contacted by the magazine 32. As plate 40 remains at its left side during rightward tabulations, there is no need to mount switch 109 on plate 40 although no harm would be done if it were unless it were to pass under a magazine 32 during such movement.

The use of two such spaced switches 109 and 110 also enables the columnar positions to be close together without chance of skipping a columnar position unintentionally although if the columns are widely spaced, use of a single switch will result in a slight saving in equipment.

Referring now to Figure 3, it will be seen that the solenoid 106 is normally connected to the output of the tabulation control circuit shown in the block diagram and that switch 110 normally connects the "on" input line to a reference voltage but is operable by cams 108 to connect the "off" input to the reference voltage. Between the "on-off" inputs and switch 110 is a set of relay switches 113 operable by a solenoid 114 to alternately connect the "on-off" inputs to switch 109. Solenoid 114 also operates a relay switch 116 to connect the paired solenoids 81 and 97 to the output circuit in place of solenoid 106. Solenoid 114 is the rightward tabulation control and will be energized whenever carriage 16 is to be tabulated to the right.

A counter 117, Figure 3, which may be of the well known electronic type is preset as above set out to a number such that after the desired number of inputs corresponding to the number of columns to be tabulated by the carriage, the counter will be restored to a zero reading, that is the preset reading is to be the complement of the number of columns to be tabulated. When a start circuit is actuated, it sets an output circuit which opens a gate 124 to enable "count" pulses to be passed to the input of counter 117 and also energizes a pulse shaper 118 which thereupon sends a positive pulse to one input of a thyratron flip flop circuit 120 to set the flip flop 120 to pass current through the tabulation solenoid 106 or solenoids 81 and 97 depending upon the direction selected. Now as the carriage 16 tabulates it operates switches 109 and 110 to alternately connect the reference, ground, voltage to the "on" and "off" inputs of a second thyratron flip flop 121. Each time the flip flop 121 is turned "off" it pulses a shaper 122 which delivers a "count" pulse to a coincidence gate 124. Actuation of the start circuit energized the gate 124 to pass "count" signals from shaper 122 to the input to counter 117 so that each passage of a cam 108 over the effective switch 109 or 110 will advance the counter 117 one step.

When counter 117 is filled to capacity, the next input count will restore all of the stages or denominations to a zero reading. Such restoration to zero is utilized to deactivate the output circuit which will thereby close gate 124 to prevent entrance of spurious "count" inputs to counter 117. Also the deactivation of the output circuit will energize a shaper 125 to generate a pulse at the shaper output. The pulse from shaper 125 actuates a delay device, 126, herein shown as a one shot multivibrator which transmits the pulse after a short delay to another input of thyratron flip flop 120 to turn the flip flop 120 back to its original condition and thereby deenergize the tabulation solenoids 81 and 97 or 106. Due to the offsetting of switches 109 and 110 in the direction of carriage travel from the tab stop 33 or 66 which will actually stop the carriage 16 in the direction for which switch 109 or 110 is active, the tab stops 33 and 66 are rendered effective in sufficient time to engage the magazine 32 which has last operated the active switch 109 or 110 to thereby terminate carriage tabulation as above set out.

Control circuit (Figures 3, 4, and 13)

A preferred embodiment of a tabulator control circuit as shown in the block diagram of Figure 3 is detailed in Figure 13. This preferred embodiment is electronically operated since it is to form a part of an electronic computer but obviously there are many equivalents known for the specific structures shown and a control circuit equivalent to that shown may be devised using other devices of the art, including circuits utilizing only straight electrical elements such as relays and switches. The direction controlling circuit is not shown in Figure 13 but it is believed clear that any manual or automatic device to throw the three switches 113 and 116 may be used to set the tabulation direction.

The counter 117 of Figure 3 is shown in Figure 13 as a three stage binary counter having a maximum capacity of seven counts although additional stages could be added if a larger capacity is required. Each stage comprises a pair of triode tubes 128 and 129 having their cathodes connected together and connected to the negative or ground side of a D. C. power source, through a grid biasing resistor 130 which is bypassed by a condenser 132. Each grid lead is connected through a resistor 133 to ground and is also connected to the plate of the other tube of the stage through a resistor 134 bypassed by a condenser 136. Each plate is also connected to the positive voltage side of the power source through a resistor 137, the pair of tubes thus forming a well known flip flop circuit wherein only one tube at a time will be conducting. Each grid is also connected through a crystal diode 138 or other unidirectional conductor to a count input line 140. As is well known, a positive pulse on line 140 will increase the grid voltage of both triodes 128 and 129 causing plate current to start passing in the non-conducting tube of the pair, which current will in the known manner be effective to shift the conductive state between the two tubes so that the originally non-conductive tube will continue conducting.

Conduction in the lower tube 129 is arbitrarily selected as the "zero" state of the counter stage. A small neon light 141 and resistor 142 are connected in series between the plate of tube 128 and the positive voltage of the power supply to light when tube 128 is conducting and thereby indicate that the counter stage stands at a "one" reading.

The output of the first counter stage is converted to a positive pulse appearing at the input line 145 of the second counter stage 144 each time the first counter stage returns to its "zero" condition, i. e. when tube 129 is rendered conductive. As shown, the plate of tube 129 is connected through a condenser 146 to the grid of an amplifier tube 148 provided with a grid resistor 149, a cathode resistor 150, both connected to the ground lead and a plate resistor 152 between the plate and the positive voltage source. A condenser 153 is connected between the plate of tube 148 and input lead 145 of the second counter stage 144. This amplifier 148 together with condensers 146 and 153 will supply the required positive pulse to the input line 145 of the second stage 144 each time tube 129 becomes conductive. It may be noted that the input diodes 154 prevent the negative pulse appearing on lead 145 when tube 129 becomes non-conducting from effecting the second counter stage 144.

The second counter stage 144 and the third 156 and any succeeding counter stages are duplicates of the first counter stage and are connected together in a series similar to the connection between the first and second counter stages so that the input line of each stage is given a positive pulse each time the preceding stage is restored to a "zero" condition.

Any counter stage may be preset to a "one" setting by operation of an associated switch 157 which transfers one lead of a condenser 158 from a charging connection to a positive voltage to a lead 160 connected to the grid of the tube 128 of the counter stage. The other leads of condensers 158 are permanently connected to the negative voltage terminal so that operation of a switch 157 will place only a momentary positive voltage on the grid of tube 128 to render it conducting and will thereafter have no effect on the grid voltage until condenser 158 is recharged.

Assigning the successive binary values 1, 2, 4 . . . to the first, second, third and any following stages, it will be clear that the counter 117 may be preset by operation of switches 157 from zero to any number from one to seven. In practice, the counter will be preset to a number which is the complement to the radix of the counter, i. e., one more than the maximum number which can be preset in the counter, or eight in the present disclosure. Then during tabulation, cams 108 will operate the input switches 109 or 110 to cause the counter to advance one number for each magazine 132 passing the switch until the counter 117 returns to zero and terminates tabulation. As an example, if the carriage is to tabulate three columns, the counter is preset to five which is the complement of three to the radix eight. The input signals will then cause the counter to advance from five to six, to seven, and to zero which stops tabulation at the third column.

After counter 117 has been preset, the tabulate switch 161 is closed to energize a relay coil 162 through a resistor 164. A resistor 165 and condenser 166 in series across the contacts of switch 161 prevent burning of the contacts while a condenser 168 across relay coil 162 slows the relay operation slightly to improve reliability. A start pulse tube 169 is connected between the positive and ground leads with a plate resistor 170, and a cathode resistor 172 bypassed with a condenser 173. The grid of tube 169 is connected by a resistor 172 to the ground lead and is also connected to a normally free contact of a switch 176 operated by relay coil 162 to transfer one lead of a condenser 177 from a negative voltage contact of switch 176 to the grid of tube 169. The other side of condenser 177 is grounded so that energization of relay coil 162 applies a momentary negative voltage to the grid of tube 169. This negative grid pulse appears as a positive pulse at the tube plate, see line "Start" of Figure 4, and passes through a condenser 178 connected between the plate and a junction between a crystal diode 180 and a resistor 181 connected to ground.

Diode 180 is connected to pass the positive pulse from condenser 178 to the grid of a control circuit 182 similar to one of counter stages with the exception that only the diode connected to the grid of the lower triode tube similar to 129 receives input pulses from the last counter stage 156. The upper triode tube similar to tube 128 will receive pulses from the start circuit as above described. As the upper triode 128 of the control circuit 182 is normally non-conductive it will become conductive and extinguish the lower triode 129 upon receipt of the pulse generated by start tube 169 in response to the closing of start switch 161.

The plate of the lower tube similar to tube 129 of control stage 182 does not control a pulse amplifier tube as tube 148 in the counter stages but is instead connected over a lead 184 to the grid of a cathode follower tube 185 having its plate connected to the positive side of the power supply and its cathode connected through a resistor 186 to the ground lead. A condenser 188 passes the voltage changes of the cathode, see the sixth line of Figure 4, which has substantially the same voltage as the lead 184, to the grid of an amplifier tube 189 provided with the conventional grid resistor 190, a plate resistor 192, and a cathode resistor 193 bypassed by a condenser 194. A condenser 196 connected between the plate of tube 189 and a junction point 197 passes a negative voltage pulse to point 197 as a result of the deenergization of the lower tube 129 of the control stage 182 and as will be seen later, will pass a positive pulse when tube 129 is later energized, see the seventh line of Figure 4.

The junction point 197 is connected to ground by a pair of series resistors 198 and 200, the mid point of the pair being connected by a grid resistor 201 to the grid of a shaper tube 202. The cathode of tube 202 is grounded but there is a resistor 204 connected between the positive source and the plate so that the tube 202 is responsive to negative pulses at junction 197 to generate positive pulses at its plate terminal. The thyratron flip flop 120 includes a pair of double grid thyratron tubes 205 and 206 each having their cathode and first grid connected to ground and their second grids each connected to a negative bias voltage lead through a pair of resistors 208 and 209 in series. A condenser 210 is connected between the plates of thyratrons 205 and 206 to extinguish a conducting thyratron when the other thyratron starts conducting. The plate of tube 205 is connected to the positive supply lead through a plate resistor 212 while the plate of tube 206 is connected to the common contact of switch 116, Figure 3, and may have its plate current pass through either the left or right direction tabulating solenoids 106 or 81 and 97 to the positive supply lead.

The plate of tube 202 which will, as pointed out above, generate a positive pulse when the start switch 161, Figure 13, is closed to start tabulation is connected to one lead of a condenser 213 which has its other lead connected to the junction of resistors 208 and 209 for tube 206 which will be assumed to be normally non-conducting. The positive pulse from condenser 213 raises the grid voltage of thyratron 206 to fire this tube and thereby extinguish thyratron 205. Current will be supplied to solenoid 106 through thyratron 206 during the entire period from the time start switch 161 is closed until carriage tabulation is arrested.

During a tabulation of the carriage either switch 109 or switch 110, Figure 3, will be operated by magazine lug 108 to alternately connect the "on" and "off" inputs of thyratron flip flop 121 to ground. This flip flop 121 comprises a pair of thyratrons, an "on" tube 214, Figure 13, and an "off" tube 216, having their plates connected together through a condenser 217 and each plate connected to the positive power lead by a plate resistor 218 such that each tube 214 or 216 will be extinguished when the other commences to conduct. The second grid of each tube 214 and 216 is directly grounded as is the cathode of tube 214. The cathode of tube 216 is connected to ground through a resistor 220. The first grid of each tube 214 and 216 is separately connected to a negative bias voltage through a pair of series resistors 221 and 222 with the input lead for each tube connected to the junction between the resistors 221 and 222 for that tube. Normally, the switch 109 or 110 will connect the input lead for "on" tube 214 to ground and this tube will be conductive since it will have zero grid bias. As the carriage 16 tabulates, magazines 32 will by cam 108 shift the switch 109 or 110 as shown in the second line of Figure 4, that is to an "off" position each time a columnar position passes. Thyratron 216 will be made conductive each time its control lead is grounded and its cathode potential will be as shown in the third line of Figure 4.

The positive changes of voltage at the cathode of tube 216 are applied through a condenser 224 to the grid of a shaper tube 225 having its plate connected to the positive voltage lead through the primary of a transformer 226. The grid and cathode of tube 225 are connected to ground through the usual grid resistor 228 and cathode resistor and condenser 229 and 230 respectively. One side of the secondary of transformer 226 is directly grounded while the other side of the secondary is grounded through a resistor 232, a condenser 233 and a resistor 234 in series. The grid of a shaper tube 236 having the usual resistor 237 and condenser 238 in its cathode circuit and a resistor 240 between its plate and the positive voltage circuit, is connected to the junction between condenser 233 and resistor 234 to receive positive pulses as shown in the fourth (234) line in Figure 4, that is a positive pulse each time thyratron 216 starts to conduct. A condenser 241 connected to the plate of tube 236 passes the plate pulses, which will of course be negative rather than positive ones, to one input of a coincidence gate 124, Figure 3. This gate as shown in Figure 13 comprises two resistors 242 and 244 each connected at one end to a positive voltage source having a voltage of say 150 volts. Two diodes 245 and 246 one for each of the resistors 242 and 244 have their negative terminals connected together and their positive terminals connected to the free end of their resistor 242 or 244. A resistor 248 is connected between the junction of diodes 245 and 246 and ground and another diode 249 has its positive terminal connected to the junction of diodes 245 and 246 and its negative terminal connected to a line of a lower positive voltage of approximately 40 volts. Thus diode 249 prevents the voltage of the junction point from being greater than the voltage of its connected terminal but does not prevent the junction point from being more negative than the 40 volts positive line.

The actual voltage of the diode junction will be substantially the same as the higher one of the two voltages at the junction of resistor 242 and diode 245 and at the junction of resistor 244 and diode 246. Normally the diodes 245, 246 and 249 will prevent these voltages from appreciably exceeding that of the 40 volt line. Any positive pulses generated at the plate of tube 236 will pass through condenser 241 to the junction of diode 246 and resistor 244 but due to the diodes 246 and 249, the voltage at such junction is not permitted to go more positive and such positive pulses will be ineffective to change the voltage at the junction of the three diodes 245, 246, and 249. Similarly, the junction of resistor 242 and diode 245 is prevented from becoming more positive than the 40 volt line.

Either or both of the two resistor-diode junctions above could have a voltage more negative than the 40 volt line for the diodes 246 and 245 would prevent a reverse flow of current and if both junctions are below the 40 volt level, diode 249 would prevent a reverse current flow so that the voltage of the diode junction will be the same as that of the higher of the two resistor-diode junctions. It has previously been pointed out that the tube 236 generates a negative plate pulse which passes through condenser 241 to diode 246 whenever the active switch 109 or 110 is connected to the "off" input of flip flop 121 but such pulses will not be effective to alter the voltage at the diode junction unless the voltage of the other resistor-diode junction is low, i. e. below 40 volts, at that time.

A diode 252 is connected with its positive lead to the junction of resistor 242 and diode 245 and has its negative lead connected to the cathode of a follower tube 253 which cathode is connected to ground through a resistor 254. So long as tube 253 is conductive, its cathode voltage is greater than 40 volts and diode 252 will not influence the voltage of its resistor-diode junction. When tube 253 stops conducting, its cathode voltage approaches the ground voltage whereupon diode 252 passes current to ground through resistor 254 to drop the voltage at the junction below the 40 volt level. Thereafter, negative pulses at the plate of tube 236 will be effective to lower the voltage at the junction of diodes 245, 246, and 249. Tube 253 thus acts as a control tube to open the coincidence gate 124 to permit passage of signals and the tube 253 is so controlled that the gate 124 is open during the time that carriage 16 is actually tabulating and is otherwise kept ineffective to prevent possible spurious signals from affecting counter 117.

Tube 253 is controlled from the control stage 182. Since the cathode voltage of tube 253 must be lowered during tabulation of the carriage 16, the plate of the "on" tube in the control stage 182 which tube corresponds to tube 128 and is at a low voltage during this time is connected over a lead 256 and through a pair of series resistors 257 and 258 to a negative bias voltage. The grid of tube 253 is connected to the junction of resistors 257 and 258 and since the plate of the tube is connected directly to the positive voltage source, it will be evident that the cathode voltage will follow the voltage of lead 256 and be high when the carriage 16 is not tabulating and low when tabulation is being effected and thus will control the passage of negative pulses from tube 236 during tabulation runs. The negative pulses at the junction of diodes 245, 246, and 249 pass through a condenser 260 and a resistor 261 to the grid of a pulse shaper tube 262 provided with a grid resistor 264, a cathode resistor 265 and condenser 266, and a plate resistor 268. A condenser 269 and a resistor 270 connected in series between the plate of tube 262 and the ground lead with counter input lead 140 connected to their junction, passes the positive pulses which appear on the plate of tube 262 to the counter input diodes 138 to thereby advance the counter 117 from the preset value as tabulation proceeds.

When the magazine 32 for the column to which the carriage is tabulating closes switch 109 or 110 by cam lug 108, the counter stages, all of which have been advanced to "one" at this time, receive an input pulse over line 140 which turns the first counter stage to "off" or "zero" which turns stage 144 to "off" or "zero" which stage then turns stage 156 to "off" and causes a positive pulse to appear on a condenser 272 connected to the plate of the third stage amplifier tube similar to tube 148. It will be noted that this condenser 272 connects to ground through a resistor 273 and is also connected to the grid of the lower tube in the control stage 182 by means of a diode 274. Thus the control stage 182 will be reset to the "off" condition when the counter stages are all reset to their "zero" condition and this will occur as the carriage 16 nears the point at which it is to be arrested as will be clear from the foregoing description.

The resetting of control stage 182 causes the tabulation control solenoids 106 or 81 and 97 to be deenergized after a slight delay period. The output lead 256 becomes more positive when stage 182 is reset and this prevents any more input pulses from passing through the diode 246 as has been set out. At the same time output lead 184 becomes more negative which will cause tubes 185 and 189 to generate a positive pulse at junction 197 in the same way as a previous negative pulse was generated, see the seventh line of Figure 4. This positive pulse may pass through tube 202 and appear as a negative pulse on the grid of thyratron 206 but as the thyratron is conducting, such a pulse will have no effect. The positive pulse at junction 197, see the seventh line of Figure 4, also passes through a series circuit composed of resistor 276, condenser 277, resistor 278 and another resistor 280. A diode 281 is connected from the junction of the resistors 278 and 280 to the grid of a tube 282 forming a part of the one shot multivibrator 126 and will pass only the positive pulses from junction 197 to the tube 282. Another tube 284 has its cathode connected to that of tube 282 with a common cathode resistor 285 connected from the cathodes to ground. Each tube has its plate connected by a resistor 286 or 288 to the positive source lead. The grid of tube 282 is connected to ground through a resistor 289 and through resistor 290 to the plate of tube 284. The grid of tube 284 is connected by a resistor 292 to the high voltage lead and also through a condenser 293 to the plate of tube 282. With these connections it will be apparent that tube 284 will be conducting due to its high grid voltage and the low potential at its plate will drop the grid voltage of tube 282 far enough below the common cathode voltage to cut off tube 282. Now application of a positive pulse to the grid of tube 282 will start the tube conducting and through condenser 293 shut off tube 284 by lowering its grid voltage. As soon as the grid voltage of tube 284 raises to its original level by leakage through grid leak 292, tube 284 will again start conducting and will shut off tube 282 once more. The time interval during which tube 284 is shut off is dependent mainly upon the values of condenser 293 and resistor 292.

The positive pulse at the plate of tube 284 when it is shut off is of no value in this case for it is transmitted through a condenser 294 to the grid of a tube 296 which is already conducting. The cathode of tube 296 is connected directly to ground and the grid resistor 297 is also connected to ground so an increase in grid voltage will not make any appreciable change in the voltage at the plate which is connected through plate resistor 298 to the high voltage lead. However, the negative pulse from the plate of tube 284 when it becomes conducting drops the grid voltage of tube 296 below the cut off value and causes the plate voltage to rise sharply, see the ninth line of Figure 4. This voltage rise passes through condenser 300 connected to the plate of tube 296 and is applied to the junction of grid resistors 208 and 209 for thyratron 205. This positive pulse will fire thyratron 205 to extinguish tube 206 and thus deenergize the tabulating solenoid 106 or 81 and 97. The carriage 16 will then be arrested by the tab stops 33 or 66 as has been set out and all parts will be in the same condition as they were in previous to the tabulation.

The foregoing description of a preferred circuit diagram is not to be taken as limiting the invention for it is deemed obvious that there are many known equivalents for the circuit elements used in performing the functions required in the logical diagram of Figure 3 and many combinations of such equivalents which can be utilized to obtain the desired results. Similarly, the mechanical features of this description of a preferred embodiment of our invention are capable of substantial variations without departing from the novel features as set forth in the following claims.

What is claimed is:

1. In a business machine of the class described having a frame, a carriage shiftable thereon, means normally effective to drive said carriage in one direction, and columnar position locating members on said carriage, the combination of a stop member engageable by said locating members to retain said carriage in columnar positions, a release device operable to render said stop member ineffective, thereby freeing said carriage for movement in said one direction, a counter mechanism presettable to represent a number of columnar positions through which said carriage is to be moved, a tabulation initiation control device settable to operate said release device, means operated by said carriage during movement through each columnar position to enter a unit count in said counter and a reset device operated by said counter when said counter reaches a predetermined value to reset said control device and said device operated thereby.

2. A tabulating mechanism for a business machine carriage having means to urge said carriage in one direction, stop members on said carriage to define columnar positions of said carriage and a tabulator stop normally engaging one of said stop members to retain said carriage in a columnar position, a tabulation control device settable to render said tabulator stop ineffective to retain said carriage, a counter presettable to a value representative of the number of columnar positions through which said carriage is to tabulate, means operated by said carriage at each columnar position to enter a unit into said counter and mechanism operated by said counter when a predetermined value is registered therein to reset said control device and thereby render said tabulator stop effective to engage a succeeding stop member and arrest said carriage.

3. In a business machine of the class described having a frame, a carriage shiftable thereon, means to shift said carriage in one direction, a tabulator stop, and members movable synchronously with said carriage and engageable by said tabulator stop to arrest said carriage in columnar positions, the combination of means operable to render said tabulator stop ineffective, a tabulation start control settable to operate said means, a counter device, means to selectively preset said counter device, mechanism controlled by movement of said carriage during tabulation to enter unit counts into said counter device and a counter device operated means to reset said tabulation start control to its original condition and thereby render said tabulator stop effective when said counter device is restored to a predetermined value.

4. In a business machine of the class described having a frame, a carriage shiftable thereon, normally ineffective means to shift said carriage in one direction, and members movable in synchronism with said carriage to define columnar positions of said carriage, the combination of a tabulation control means operable to render effective said normally ineffective carriage shifting means, a counter device presettable to a value representative of a number of columnar positions through which said carriage is to tabulate, mechanism operable by each of said synchronously moved members to change the preset value in said counter by one unit as said carriage is moved into the columnar position defined by said member, and means operated by said counter device when the value therein becomes a predetermined value, to restore said tabulation control means to a non-operated condition and thereby restore said carriage shifting means to its normal condition.

5. A business machine of the class described comprising a frame, a shiftable carriage, normally ineffective mechanism to move said carriage in one direction, an electrically energized device to render said carriage moving mechanism effective, a tabulation control means operable to energize said device, a counter operable by an electrical pulse to change a value in said counter by one unit, means to preset said counter to a value representative of a distance through which said carriage is to be moved, members on said carriage and frame to supply a pulse to said counter for each unit of movement of said carriage and means controlled by said counter when the value therein becomes a predetermined value to reset said tabulation control means and deenergize said electrically operated device.

6. A business machine of the class described having a frame, a carriage shiftable thereon, means to drive said carriage in one direction, a tabulator stop on said frame and members on said carriage engageable by said tabulator stop to arrest said carriage in columnar positions, normally effective means to retain said tabulator stop in an arresting position, an electrically operated mechanism to shift said normally effective means to a position wherein said tabulator stop is ineffective to arrest movement of said carriage by said drive means, a tabulation control device settable to energize said electrically operated mechanism, a counter device, means to preset said counter device to a value representative of the number of columnar positions through which said carriage is to be tabulated, a switch operated by one of said members on said carriage at each columnar position, an impulse generator controlled by said switch to supply a pulse to said counter device to alter the value therein by one unit for each operation of said switch, and means controlled by said counter device when a control value becomes indicated therein to reset said tabulation control device and deenergize said electrically operated mechanism whereby said tabulator stop is again retained effective to arrest movement of said carriage.

7. A business machine comprising a frame, a carriage shiftable on said frame, means driving said carriage in one direction, columnar position defining members on said carriage, a tabulator stop on said frame to engage said columnar members and arrest said carriage, energizable means to render said tabulator stop ineffective and free said carriage for movement by said driving means, a tabulation control device settable to energize said energizable means, a counting device operable by electrical pulses to alter the value registered in said counting device by unitary increments, manipulative means to preset said counting device to a value representing the number of columnar positions through which said carriage is to be tabulated, an impulse generating circuit under control of said columnar members on said carriage and connected to said counting device to supply a pulse to said counting device each time said carriage enters a new columnar position, and tabulation terminating means operated by said counting device when a predetermined value appears therein to reset said tabulation control device and thereby deenergize said energizable means to arrest movement of said carriage at the selected columnar position.

8. In a business machine of the class described having a frame, a carriage shiftable thereon, means normally effective to drive said carriage in one direction, engageable means to drive said carriage in an opposite direction and columnar position locating members on said carriage, the combination of a stop member engageable with said locating members to retain said carriage in columnar positions, a first device operable to render said stop member ineffective, thereby freeing said carriage for movement in said one direction, a second device operable to render said engageable means effective, a counter mechanism presettable to represent a number of columnar positions through which said carriage is to be moved, a tabulation initiation control device settable to operate a selected one of said devices, means operated by said carriage during movement through each columnar position to operate said counter and a reset device operated by said counter when said counter reaches a predetermined value to reset said control device and said selected device operated thereby.

9. A tabulating mechanism for a business machine carriage having means to urge said carriage in one direction, stop members on said carriage to define columnar positions of said carriage, a tabulator stop normally engaging one of said stop members to retain said carriage in a columnar position, and engageable means to drive said carriage in a reverse direction, a tabulation control device, means settable to enable operation of said device to render said tabulator stop ineffective to retain said carriage or to operate said engageable means, a counter mechanism presettable to a value representative of the number of columnar positions through which said carriage is to tabulate, means operated by said carriage at each columnar position to enter a unit into said counter and mechanism operated by said counter when a predetermined value is registered therein to reset said control device and restore said tabulator stop or said engageable means to normal condition.

10. In a business machine of the class described having a frame, a carriage shiftable thereon, means to shift said carriage in one direction, a tabular stop, members movable synchronously with said carriage and engageable by said tabulator stop to arrest said carriage in columnar positions and an engageable drive means to shift said carriage in an opposite direction, the combination of a first means operable to render said tabulator stop ineffective, a second means operable to engage said engageable drive means, a tabulation start control, a switch to connect said start control to one of said first and second means to enable said start control to operate the connected one of said means, a counter device, means to selectively preset said counter device, mechanism controlled by movement of said carriage during tabulation to enter unit counts into said counter device, a counter device operated means to restore said tabulation start control to its original condition, and means operated thereby to return the operated one of said first and second means to normal position.

11. A business machine of the class described having a frame, a shiftable carriage, a first normally ineffective mechanism to move said carriage in one direction, a second normally ineffective mechanism to move said carriage in an opposite direction, a switching device selectively connectable to either said first or said second mechanism, a tabulation start control to operate said switching device to render the connected one of said carriage moving mechanisms effective, a counter operable by electrical pulses to change a value in said counter by one unit, means to preset said counter to a value representative of a distance through which said carriage is to be moved, members on said carriage and frame to supply a pulse to said counter for each unit movement of said carriage, and means controlled by said counter when the value therein becomes a predetermined value to reset said tabulation start control and said switching device to terminate movement of said carriage.

12. In a business machine of the class described having a frame, a carriage shiftable thereon, two normally ineffective means each to shift said carriage in one of two directions and members movable in synchronism with said carriage to define columnar positions of said carriage, the combination of a tabulation control means, a settable device to connect said tabulation control means to one or the other of said normally ineffective means, said control means being operable to render effective the connected one of said normally ineffective carriage shifting means, a counter device presettable to a value representative of a number of columnar positions through which said carriage is to tabulate, mechanism operable by each of said synchronously moved members to change the preset value in said counter by one unit as said carriage is moved into the columnar position defined by said member, and means operated by said counter device when the value therein becomes a predetermined value, to restore said tabulation control means to a non-operated condition and thereby restore the connected one of said carriage shifting means to its normal condition to end tabulation of said carriage.

13. A business machine of the class described having a frame, a carriage shiftable thereon, two carriage driving means, each to drive said carriage in one of two directions, a tabulator stop on said frame and members on said carriage engageable by said tabulator stop to prevent movement of said carriage by one of said carriage driving means and arrest said carriage in columnar positions, normally effective means to retain said tabulator stop in an arresting position, electrical means operable to render the second of said driving means effective, an electrically operated mechanism to shift said normally effective means to a position wherein said tabulator stop is ineffective to arrest movement of said carriage by said one carriage driving means, a tabulation control device, a switch presettable to connect said control device to said electrically operable means or said electrically operated mechanism, said tabulation control device settable to energize either said electrically operable means or said electrically operated mechanism, a counter device, means to preset said counter device to a value representative of the number of columnar positions through which said carriage is to be tabulated, a switch operated by one of said members on said carriage at each columnar position, an impulse generator controlled by said switch, a transmission device under control of said tabulation control device to supply pulses from said generator to said counter device when said tabulation control device is set to alter the value in said counter device by one unit for each operation of said switch, and means controlled by said counter device when a control value becomes indicated therein to reset said tabulation control device and deenergize the connected one of said electrically operable means and said electrically operated mechanism to terminate carriage tabulation.

14. A business machine comprising a frame, a carriage shiftable on said frame, means urging said carriage in one direction, columnar position defining members on said carriage, a tabulator stop on said frame to engage said columnar members and arrest said carriage, engageable means to drive said carriage in a reverse direction, energizable means to render said tabulator stop ineffective and free said carriage for movement by said urging means, a second energizable means to engage said engageable means, a tabulation control device, a switch settable to enable said control device to energize either said first or said second energizable means, a counting device operated by electrical pulses to alter the value registered in said counting device by unitary increments, manipulative means to preset said counting device to a value representing the number of columnar positions through which said carriage is to be tabulated, an impulse generating circuit under control of said columnar members on said carriage, transmission means controlled by said impulse generating circuit and said tabulation control device to supply a pulse from said impulse generating circuit to said counting device each time said carriage enters a new columnar position, tabulation terminating means operated by said counting device when a predetermined value appears therein to reset said tabulation control device and thereby deenergize the energized one of said energizable means to arrest movement of said carriage at the selected columnar position, a stop to prevent movement of said carriage in said reverse direction, means operated by said second energizable means to move said stop to an ineffective position during driving of said carriage by said engageable drive means, said stop becoming effective at termination of tabulation in said reverse direction to prevent said carriage from coasting out of the desired columnar position.

References Cited in the file of this patent

UNITED STATES PATENTS

| | | |
|---|---|---|
| 2,337,091 | Fettig | Dec. 21, 1943 |
| 2,442,402 | Davidson et al. | June 1, 1948 |
| 2,748,665 | Senn | June 5, 1955 |